(12) United States Patent
Boyle et al.

(10) Patent No.: US 11,379,779 B2
(45) Date of Patent: Jul. 5, 2022

(54) TELECOMMUNICATION EVENT OBJECT CLASSIFICATION BASED ON INFORMATION FROM MULTIPLE PROTOCOLS

(71) Applicant: Ribbon Communications Operating Company, Inc., Westford, MA (US)

(72) Inventors: Charles W. Boyle, Upton, MA (US); Surya Kumar Kowali, Plano, TX (US); Nizar K. Purayil, Bangalore (IN); Vsevolod V. Ostapenko, Boxborough, MA (US); Mahesh Kumaravel, Bengaluru (IN)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 0 days.

(21) Appl. No.: 16/962,822

(22) PCT Filed: Jul. 12, 2019

(86) PCT No.: PCT/US2019/041548
§ 371 (c)(1),
(2) Date: Jul. 16, 2020

(87) PCT Pub. No.: WO2020/014575
PCT Pub. Date: Jan. 16, 2020

(65) Prior Publication Data
US 2021/0135954 A1 May 6, 2021

Related U.S. Application Data

(60) Provisional application No. 62/763,969, filed on Jul. 12, 2018.

(51) Int. Cl.
*H04L 12/24* (2006.01)
*H04W 24/02* (2009.01)
(Continued)

(52) U.S. Cl.
CPC ..... *G06Q 10/06393* (2013.01); *G06F 16/907* (2019.01); *G06K 9/6218* (2013.01);
(Continued)

(58) Field of Classification Search
CPC ..... H04W 24/08; H04W 24/02; H04W 24/10; H04W 24/04; H04L 41/5009; H04L 43/0823
See application file for complete search history.

(56) References Cited

U.S. PATENT DOCUMENTS 8,565,076 B2  10/2013  Kovvali et al.
8,732,170 B2   5/2014  Kalavade
(Continued)

FOREIGN PATENT DOCUMENTS

CN  105809358 A  *  7/2016
EP    3197097 A1     7/2017
(Continued)

OTHER PUBLICATIONS

International Searching Authority, PCT Notification of Transmittal of the International Search Report and the Written Opinion of the International Searching Authority, or the Declaration dated Oct. 7, 2019, for International Appl. No. PCT/US2019/041548, 8 pages, Alexandria, VA.
(Continued)

Primary Examiner — Kostas J Katsikis
(74) Attorney, Agent, or Firm — Haynes and Boone, LLP (57) ABSTRACT

A method performed by a computing system that collects information on transactions in a telecommunication system includes receiving an event object. The event object includes parameters associated with a telecommunication event. The method further includes classifying the event object, using a classification mechanism, as one of a plurality of Key Performance Indicators (KPIs) by using the parameters,
(Continued)

including considering events from multiple protocols for classifying event objects. The method further includes, after classifying the event object, inferring relationships between a set of inputs and a set of outputs, the set of inputs including information types from the event object and the set of outputs including KPIs.

20 Claims, 5 Drawing Sheets

(51) Int. Cl.
| | |
|---|---|
| *H04W 24/10* | (2009.01) |
| *H04W 24/04* | (2009.01) |
| *H04L 12/26* | (2006.01) |
| *G06N 5/04* | (2006.01) |
| *H04W 24/08* | (2009.01) |
| *G06Q 10/06* | (2012.01) |
| *G06F 16/907* | (2019.01) |
| *G06K 9/62* | (2022.01) |
| *G06N 3/08* | (2006.01) |
| *H04L 41/5009* | (2022.01) |
| *H04L 43/0817* | (2022.01) |
| *H04L 43/0823* | (2022.01) |
| *H04L 65/10* | (2022.01) |
| *H04L 65/1073* | (2022.01) |
| *H04L 65/65* | (2022.01) |
| *H04M 3/51* | (2006.01) |
| *H04L 41/0631* | (2022.01) |
| *H04L 41/16* | (2022.01) |

(52) U.S. Cl.
CPC ......... *G06K 9/6257* (2013.01); *G06K 9/6278* (2013.01); *G06N 3/08* (2013.01); *G06N 5/04* (2013.01); *H04L 41/0631* (2013.01); *H04L 41/16* (2013.01); *H04L 41/5009* (2013.01); *H04L 43/0817* (2013.01); *H04L 43/0823* (2013.01); *H04L 65/1006* (2013.01); *H04L 65/1073* (2013.01); *H04L 65/608* (2013.01); *H04M 3/5175* (2013.01); *H04W 24/02* (2013.01); *H04W 24/04* (2013.01); *H04W 24/08* (2013.01); *H04W 24/10* (2013.01)

(56) References Cited

U.S. PATENT DOCUMENTS

| | | | |
|---|---|---|---|
| 8,755,297 B2 | 6/2014 | Kalavade | |
| 8,908,507 B2 | 12/2014 | Kovvali et al. | |
| 9,001,682 B2 * | 4/2015 | Kovvali | ................ H04W 48/18 |
| | | | 370/252 |
| 9,204,329 B2 | 12/2015 | Boyle et al. | |
| 9,204,474 B2 | 12/2015 | Kovvali et al. | |
| 9,414,248 B2 | 8/2016 | Kovvali et al. | |
| 2009/0075648 A1 | 3/2009 | Reed et al. | |
| 2009/0075655 A1 | 3/2009 | Dobson et al. | |
| 2010/0082125 A1 | 4/2010 | Pingel et al. | |
| 2014/0269269 A1 * | 9/2014 | Kovvali | ................ H04W 24/04 |
| | | | 370/252 |
| 2015/0181022 A1 * | 6/2015 | Vaderna | ................ H04W 24/10 |
| | | | 455/422.1 |
| 2016/0261468 A1 | 9/2016 | Premkumar et al. | |
| 2016/0349960 A1 | 12/2016 | Kumar et al. | |
| 2017/0034014 A1 | 2/2017 | Bingham et al. | |
| 2018/0084049 A1 | 3/2018 | Wu et al. | |
| 2021/0056487 A1 * | 2/2021 | Boyle | .............. G06Q 10/06393 |

FOREIGN PATENT DOCUMENTS

| | | | |
|---|---|---|---|
| EP | 3342146 A1 | 7/2018 | |
| EP | 3342146 B1 | 3/2021 | |
| WO | WO 2017/037598 A1 | 3/2017 | |

OTHER PUBLICATIONS

European Patent Office, Communication—European Search Report dated Mar. 11, 2022 for Application No. 19834784.1, 8 pages, Munich Germany European Patent Office, Communication—European Search Report dated Mar. 9, 2022 for Application No. 19833131.6, 8 pages, Munich Germany.

European Patent Office, Communication—European Search Report dated Mar. 11, 2022 for Application No. 19834934.2, 8 pages, Munich Germany.

European Patent Office, Communication—European Search Report dated Mar. 1, 2022 for Application No. 19834933.4, 9 pages, Munich Germany.

* cited by examiner

| Type | Prot. 1 | Cause | Reason | Prot. 2 | Subcat. | A | B | C | D |
|------|---------|-------|--------|---------|---------|---|---|---|---|
|      |         |       |        |         |         | 1 | 0 | 0 | 0 |
|      |         |       |        |         |         | 1 | 0 | 0 | 0 |
|      |         |       |        |         |         | 0 | 0 | 0 | 1 |
|      |         |       |        |         |         | 0 | 0 | 1 | 0 |
|      |         |       |        |         |         | 0 | 0 | 0 | 1 |
|      |         |       |        |         |         | 0 | 0 | 0 | 1 |
|      |         |       |        |         |         | 1 | 0 | 0 | 0 |
|      |         |       |        |         |         | 1 | 0 | 0 | 0 |
|      |         |       |        |         |         | 0 | 1 | 0 | 1 |
|      |         |       |        |         |         | 0 | 1 | 0 | 0 |
|      |         |       |        |         |         | 0 | 0 | 1 | 0 |
|      |         |       |        |         |         | 0 | 1 | 0 | 0 |
|      |         |       |        |         |         | 0 | 0 | 0 | 1 |

TELECOMMUNICATION EVENT OBJECT CLASSIFICATION BASED ON INFORMATION FROM MULTIPLE PROTOCOLS

PRIORITY INFORMATION

This application is a U.S. National Stage patent application of International Patent Application No. PCT/US2019/041548 filed on Jul. 12, 2019, which claims the benefit of U.S. Provisional Patent No. 62/763,969 filed Jul. 12, 2018 and entitled "A Method for Automatically Classifying Network Performance and Degradation and Corrective Action Given Network Data Events and Key Performance Indicators," the disclosures of which are hereby incorporated by reference in their entirety.

BACKGROUND

Network service providers such as mobile operators, cable operators or Internet service providers spend a disproportionate amount of time and money operating the network as compared to the original cost of network roll-out. This stems from the complex relationship of layered, multi-vendor network elements, geographically dispersed communication, the mesh of interconnectivity to handle capacity and failures, as well as the historical nature of the services which require backwards compatibility with the end-users (e.g. service subscribers). A component in maintaining these networks is the software that delivers core operational functions such as performance monitoring and fault management, ultimately contributing to the analysis and resolution.

Traditional systems that implement this core function include an over-arching Operational Support System (OSS), one or more Network Management System (NMSs), and many Element Management Systems (EMSs). This hierarchy allows each subsystem to attempt to correlate cause within its scope. That is, the EMS system may realize what is causing Key Performance Indicator (KPI) issues with underlying network elements (e.g., router, switch, application gateway). The NMS may correlate across multiple network elements associated with a particular vendor product suite, and the OSS may look to diagnosis failures across multiple vendors with the details from underlying systems.

As the network size, number of subscribers, types of user devices, and services increase, various types of KPIs, and their associations and densities relative to specific locations, network elements, device types, etc, may be over-whelming for application developers or performance engineers to continue to update software solutions to support the complexity.

BRIEF DESCRIPTION OF THE DRAWINGS

The present disclosure is best understood from the following detailed description when read with the accompanying figures.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As mentioned above, as the network size, number of subscribers, types of user devices, and services offerings increase, various types of KPIs, and their associations and densities relative to specific locations, network elements, device types etc., may be over-whelming for application developers or performance engineers to continue to update software solutions to support the complexity. Thus, may become very difficult to properly diagnose problems within the network. This is because there are many factors that may affect whether a particular call is successful. In order to run various analytical functions on large amounts of data it may be desirable to classify certain telecommunication events into various KPI categories. For example, one KPI may be a failed registration. Another KPI may be a dropped call. However, classifying various telecommunication events (such as calls) may be difficult because a typical call involves multiple telecommunication protocols and multiple pieces of hardware. Moreover, data from just one protocol may not be sufficient to identify the event with as much specificity as desired. For example, the SIP protocol may return a cause code of 480, indicating that the callee is currently unavailable, whereas the real issue may be a Radio Access Network (RAN) malfunction preventing connection. However, SIP information alone may be insufficient to determine exactly why the callee is currently unavailable.

According to principles described herein, telecommunication events, such as calls, are represented by a data structure that will be referred to as an event object. Event objects are classified into various KPI categories. This may be done, for example, by using a rules table that is prepopulated by a computer or a human user. The rules table, or other classification mechanism, uses information from more than just a single protocol. For example, the classification mechanism may use data from SIP as well as Q.850. In other words, the classification mechanism may include information for protocols throughout the life of a call, including set up, tear down, media exchange and the like. The classification mechanism may also take into account protocols used by different portions of the network, such as those protocols used by the Radio Access Network (RAN), the Core Network (CN), the user equipment or end-user device (UE), and the like.

The classification mechanism may also consider other pieces of information such as packet loss or jitter. In addition to assigning a KPI category, the classification mechanism may assign a sub-category. Sub-categories may give more specific information. For example, a particular KPI may be a dropped call. However, there may be several causes to a dropped call. A dropped call may be caused by an issue with the caller or callee device. A dropped call may also be caused by a radio issue. The classification may provide additional information used to fully interpret particular conditions. For example, a particular failure scenario may be determined, through standards body, or de facto knowledge to be acceptable and thus treated as a success or even ignored rather than a failure. Still in other cases, information such as color coding may be used to drive the severity of a problem through a UI.

This more precise method of classification allows for better analysis of large amounts of call data to determine what factors may be causing various issues to occur. By more precisely classifying event objects, the relationships between input parameters (e.g., device, region, protocols used) and output parameters (KPIs) may be more effectively inferred. Such relationships may be inferred, for example, through machine-learning functions. Thus, by classifying event objects as described herein, the event objects may be formatted in a way that allows for better inference between causes and outcomes in telecommunication systems.

Figure 1:
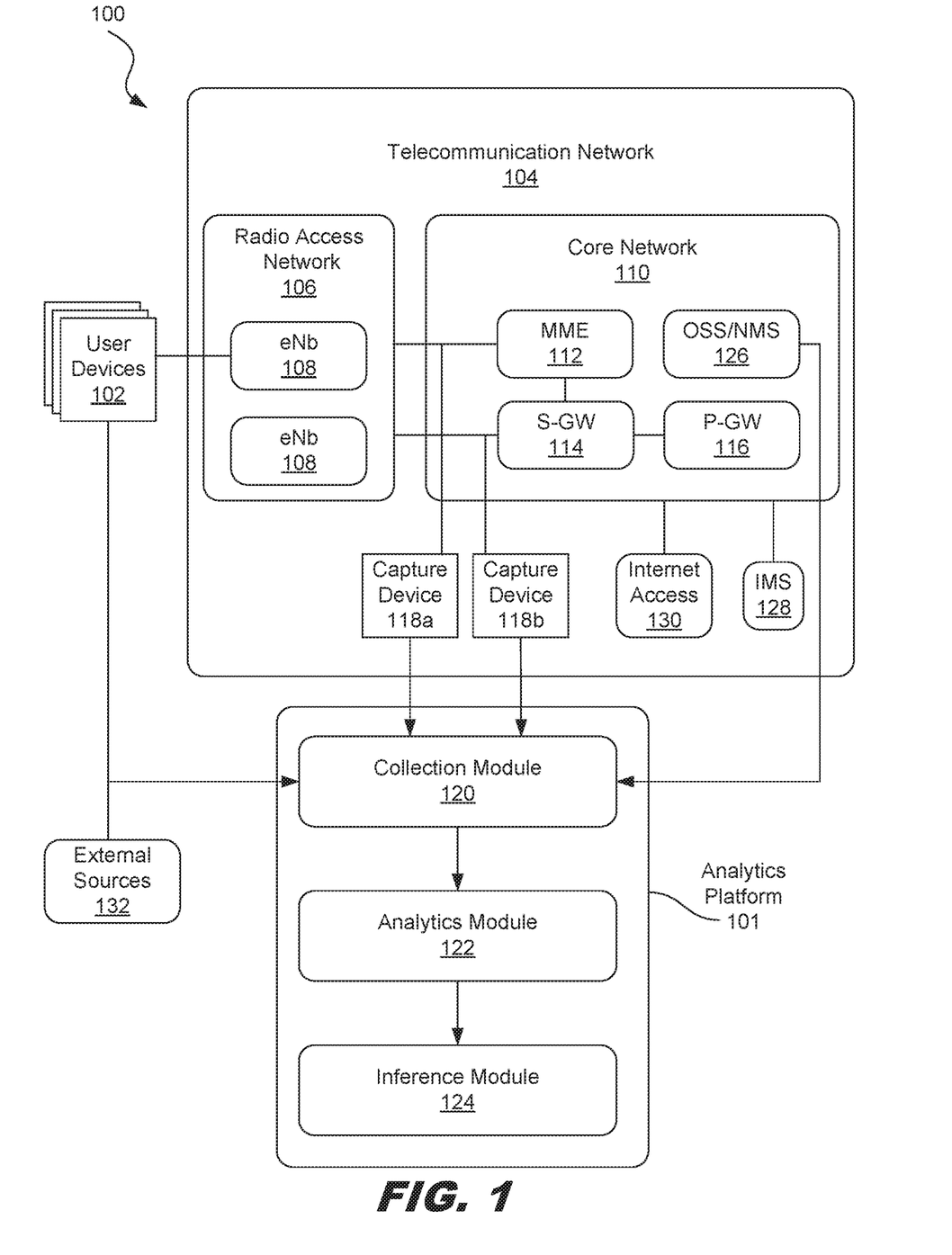
FIG. 1 is a diagram showing an illustrative environment in which classification of telecommunication event objects may be performed, according to one example of principles described herein.

FIG. 1 is a diagram showing an illustrative environment 100 in which classification of telecommunication event objects may be performed. According to the present example, the environment includes a telecommunication network 104 that establishes communication sessions between devices 102. In the present example, the telecommunication network 104 is a Long Term Evolution (LTE) network, which may be used to provide VoLTE services. However, the principles described herein may be applied to other types of networks, such as 3G networks, 5G networks, cable networks, and the like.

In short, the telecommunication network 104 may include various capture devices 118a, 118b that collect information from network events, such as communication sessions or calls. That captured information is then provided to a collection module 120. The collection module 120 includes hardware and/or logic for taking the information captured by the capture devices 118a, 118b and putting it into a particular data structure. Such data structure will be referred to as an event object. The event objects created by the collection module 108 are then provided to the analytics module 122 for classification. The classified event objects are then provided to the inference module 124 to infer relationships between input parameters (e.g., device, region, protocol) and output parameters (KPIs).

As will be explained in further detail below, an event object may include information from multiple protocols (for example, SIP, RTP, S11-MME etc.) that are involved in a VoLTE call. Because a specific attribute such as IMSI & CallID may not be present in every protocol associated with a particular call, the information from multiple protocols may be used to identify common attributes across two or more protocols. For example, voice call identifiers are present in SIP, and not present in RTP and S11-MME. Similarly, an IMSI identifier is present in S11-MME but not present in SIP, RTP etc. S11-MME includes user plane tunnel establishment procedures and user plane tunnel identifiers (which are also present in S1U user plane tunnels that carry SIP and RTP traffic), tunnels-ID may be used to correlate between S11-MME & S1U user planes that carry SIP and RTP protocol packets. Thus IMSI information in the event objects may be determined by correlating between S11-MME and S1U protocol data. Similarly CallID information may be populated in an event object by correlating SIP data with SDP and RTP protocols. The protocol flows for multiple protocols may be correlated pairwise by matching common attribute fields and temporal sequence of protocols such as, for example, S1-MME exchange preceded S1-U/SIP traffic and protocol insights.

In further detail, the telecommunication network 104 includes a radio access network 106 and a core network 110. The radio access network 106 includes the stations (in this case eNodeB's 108) that wirelessly connect to mobile devices, such as the user devices 102. Such wireless devices may be referred to as User Equipment (UEs). The user devices 102 may include any piece of hardware and/or software that is capable of interfacing with the telecommunication network 104. For example, a user device 102 may include a smart phone, a desktop computer, a laptop computer, a tablet computer, or other computing system. The user devices 102 may interface with the telecommunication network using a variety of telecommunication protocols. For example, the user devices 102 may communicate using SIP and Real-time Transfer Protocol (RTP). Other protocols are contemplated.

As mentioned above, while the telecommunication network 104 may be one of a variety of types of networks offering a number of applications and services, the present example is an LTE network that may provide Voice over Long Term Evolution (VoLTE) services. A VoLTE service establishes packet-switched connections between two user devices using the media bearer plane of the LTE standards.

Continuing this example, the telecommunication network 104 may include various pieces of infrastructure. For example, the telecommunication network 104 may also include a core network (Referred to as Evolved Packet Core (EPC)) that includes a Mobility Management Entity (MME) 112, a Service Gateway (S-GW) 114, a Packet Data Network (PDN) Gateway (PGW) 116, and an Operations Support System (OSS) and a Network Management System (NMS) 126. The core network 110 may provide connection to the Internet through the internet access module 130 and various IP multimedia (IMS) servers 128. In other examples where the telecommunication network is a VoIP network, the infrastructure may include a variety of internet servers.

The MME 112 is a control-node for the LTE access-network. It is responsible for idle mode UE (User Equipment) paging and tagging procedure including retransmissions. The MME 112 is involved in the bearer activation/deactivation process and is also responsible for choosing the SGW for a UE at the initial attach and at time of intra-LTE handover involving Core Network (CN) node relocation. It is responsible for authenticating the user (by interacting with the Home Subscriber Server (HSS)). The MME 112 checks the authorization of the UE to camp on the service provider's Public Land Mobile Network (PLMN) and enforces UE roaming restrictions. The MME 112 handles the security key management. Interception of signaling is also supported by the MME, such as the capturing performed by capture device 118a. For example, signaling traffic exchange with the MME may be mirrored by the MME or mirrored by a transit network device such as a router or tapped by optical tap, and fed to the capturing device 118a The SGW 114 routes and forwards user data packets, while also acting as the mobility anchor for the user plane during inter-eNodeB handovers and as the anchor for mobility between LTE and other 3GPP technologies. The SGW 114 manages and stores UE contexts, e.g. parameters of the IP bearer service, network internal routing information. It also performs replication of the user traffic for interception.

The PGW 116 provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception and packet screening. Another role of the PGW is to act as the anchor for mobility between 3GPP and non-3GPP technologies.

The capture devices 118 may include various probes, deep packet inspection devices, or other virtualized packet analysis functions that collect the data being transmitted to either the MME or the SGW. For instance, each capture device may collect and decode data packets and send digest of the data packets to the analytics platform 101. The digest of the data packets may include particular protocol events, associated network elements associated with the activity, call or flow identifiers, other application/protocol specific information elements (e.g. web site, location, etc), specific measurements (e.g. upstream/downstream packets, upstream/downstream bytes, inter-packet measurements, latency between certain procedures, etc), The capture devices 118 may include, for example, a Data Capture Engine (DCE) and a Network Data Processor (NDP). The DCE may capture the relevant data and the NDP may process that data. The NDP may then pass the data to the analytics platform 101, and more particularly, the collection module 120 of the analytics platform 101. In some examples, the collection module 120 instructs the capture devices 118a, 118b to collect specific types of data. For example, the collection module 120 may detect a negative event such as a dropped call, or a threshold number of dropped calls, and request that the capture device provide specific pieces of information.

The data capture devices 118a, 118b (via optical TAP, port mirror, bump-in-the-wire, etc.), may have intermittent packet losses, due to network/memory/CPU load or due to race conditions in protocol processing. For example, if a tunnel deletion event from S11 is processed by the DCE before all the data corresponding to that tunnel, the tunnel may be marked as deleted and the remaining data of that tunnel may not be processed correctly. Because the DCE is acting on a copy of the packets, while the end-systems processes correctly, DCE interpretation may be inaccurate in some cases. These cases are accommodated by multi-protocol correlated view of a call, rather than depending on a specific protocol; for example, if 200OK response is missing for an INVITE transaction, but there is bidirectional RTP data for a time greater than a configured period, and bidirectional data is greater than configured value, the call could be considered as successful. Similarly, if INVITE transaction is missing, and 200OK (INVITE) is received the Analytic system per the current technique considers the call as successful.

In some examples, the capture devices only record data for a preset period of time in the past. For example, the capture devices 118a, 118b may collect event data for the past hour and store it in a First In First Out (FIFO) buffer. Thus, any new data coming in overwrites the oldest data. If the capture devices 118a, 118b receive a request from the collection module for certain data, then the data in the buffer may be sent to the collection module 120.

The collection module 120 includes the hardware and/or software to receive data from the capture devices and create a data structure that stores various pieces of information about a particular event (e.g., call). The collection module 120 may receive data from other sources such as the user devices 102, the OSS/NMS 126, and other external sources 132 such as blogs of experience or network outage, security threats impact the area associated with user devices (e.g. Apple, Android), applications (e.g. YouTube player), services (e.g. email, voice calls), or Operating Systems/versions (e.g. OSX 13, iOS 10), etc. Such a data structure may be referred to as an event object 301 which comes in several forms such as failed call 202, failed registration 204, etc and will be discussed in further detail below with the text accompanying FIG. 2. The collection module 120 may include one or more computing systems such as servers.

The collection module 120 may also perform various operations on the data it receives to format it for classification and inference. For example, the collection module may perform a dimensional drill down to identify specific dimensions worth taking a closer look at. Specifically, the collection module 120 may identify the top dimensions for each class of failure or anomaly and suggest focus points for deeper analysis. It groups failures and protocol anomalies (such as interpacket gaps, packet drops, jitter etc.), as major categories and failure types and identifies dominant dimensions for drill-down. For example, the major categories may include repeat calls, dropped calls, one-way calls etc. Protocol KPI based characterization (based on protocol cause codes, observed packet behavior etc.) and failure type are identified. The failure types identified are suggestive of cause of failure, and include device cause, RAN-cause, core network cause, IMS-cause, and the like.

The collection module 120 may also reduce the data into smaller samples. More specifically, the collection module may reduce the data volumes (table rows) in a plurality of tables (for example SIP, RTP, S11, Sv etc., in 3GPP VoLTE deployments) by using the value of dimension attributes (for example, regional_area=Southeast), from the alarm/error/warning/Information alerts together with the time-window of the event and reduce the data scope in multiple tables. The data reduction may significantly help service personnel to focus on much smaller datasets near anomaly peaks, in the segments where the anomalies occurred. This also removes bias due to the large normal data and facilitates faster convergence of the inference functions (which will be described in further detail below). Because the percentage of failures in a stable service provider network is very small (<1%), the data reduction is significant. If the data reduction is done in a transit network element on the edge of the network before being stored in a data warehouse, the amount of storage may be significantly reduced.

To further reduce the amount of data, extraneous data for successful or non-problematic calls may be removed, while such data is kept for problematic calls. Specifically, for non-problematic calls that follow the normal setup sequence via SIP, and exchange data via RTP without voice/video quality problems, and successfully terminate using SIP/BYE method, the only interesting attributes may be total duration and voice quality (Uplink/Downlink MOS scores). Thus, other data from such event objects may be removed. In some examples, if the Mean Opinion Score (MOS) scores are computed in real-time on the collected RTP/RTCP parameters, MOS scores for the duration of the call may be sufficient for the analytic system. The remaining fine-grained data may be unimportant. However, for problematic calls, fine-grained data from SIP/RTP/RTCP/S11/SV protocols may facilitate root-cause analysis. Thus the data volume reduction may be performed by determining the dominant normal protocol sequences (for example non-problematic call, or Un-answered call) and keeping minimal information for such calls.

In a stable VOLTE network most calls are successful and corresponding protocol KPIs are good. Thus, for a large volume of call related events (e.g., 10 Million calls per day) only a small portion (e.g., less than 5%) of such events correspond to calls with a problematic issue (call drops, call establishment failures, media gaps, etc.). Furthermore, a small percentage of the bad KPIs are due to a specific eNodeb, a specific device type, or user mobility, etc. However, the 95% of good KPI events dominate the amount of data and strongly bias any statistical algorithms. Filtering out 95% of such data with good KPIs may be inadequate because it may remove the conditions around the anomalies with which to compare data from bad KPIs. Thus, in some examples described herein, the collection module 120 may first select the events with anomalous KPIs, extracting the dimension value of those events (e.g., eNBs, device types, SGWs, APN, QCI etc.), and extract the events for those dimensions from the original large data volume.

For example, if registration failures are high, and the dimensions show, "device types A, B, and eNBs 30, 32, 40, 50, APNs ALAS," then extracting event data, only when "any of the dimension values match," reduces the amount of data to be analyzed. Feeding the filtered or reduced data to the analytics module 122 and inference module 124 estimates a Problem Diagnosis (PD) by assigning weights to the underlying dimensions. For example, the registration failures could be due to a new vendor device in a particular geographical region of an operator network. This process is repeated for each KPI and the associated anomaly type. The reduced dataset, when fed to the analytics module, facilitates focused visibility to service personnel for additional drill-down and cause analysis.

Additionally, data reduction may include a density-based reduction in which the protocol cause codes (SIP, Q.850, S11, S1-MME, Sv etc.) along with data observations (such as RTP/RTCP media data) such as packet loss, delay, jitter are used to roll-up to a summary Call-KPI (CPI), and the density (%) of each underlying protocol cause is determined, and the top density causes are determined and used to extract information corresponding to the highest density causes. The rules table 300, illustrated in FIG. 3, combines signaling events (SIP cause codes, reason codes, observations from RTP, SRVCC events from Sv interfaces, S11, S1-MME cause codes etc.) for characterizing dropped calls, and the proportion of each cause code to the dropped calls. In one example, it may be determined that 71.17% of dropped calls have inactivity time out after SIP INVITE method. Because the dropped calls are a small proportion of all calls, (for example <5%), filtering out "INVITE+inactivity-timeout", for dropped call analysis from the total dataset is a substantial reduction. The "failure category" in a rules table, as will be described in further detail below, may be determined from the UPLINK/DOWNLINK of the procedure, call-type (Mobile Terminated/Mobile Originated) and the type of cause; for example, for a mobile terminated call, inactivity timeout after SIP INVITE is sent to the mobile device could be due to radio coverage.

VoLTE/VILTE services involve several underlying control plane and user plane protocols. For example, S1-MME control protocol may be used between the MME 112 and eNB 108 to establish User Plane Tunnels through data-plane (S1U) between the SGW 114 and eNB 108. S11 protocol may be used between the MME 112 and SGW 114. SIP relates to the control plane that runs over the S1U user plane. The RTP data plane carries user data packets using S1U tunnels. Each of these protocol packets are received via the capture devices 118a, 118b (which may include, for example, an optical tap or mirror port) and processed in a compute server node which may be part of the collection module 120. The collection module 120 may also be referred to as a Data Capture Engine (DCE).

Each protocol uses bidirectional packets. For example, SIP traffic flows from the User Device (UE) to the IMS Server, and from the IMS server to the UE. The DCE maps both directions of a flow, for example for a User Call, and creates transactional events, such as INVITE, REGISTER etc. Similarly, the collection module 120 maps each call to a User-IMSI (terminating or originating) based on correlating between user plane tunnel and the control plane (S1-MME or S11) that establishes the user plane tunnel. The events have associated status codes that identify Success, Failure Reasons, Progress indication (for example ringing etc.). When a call is successful, an RTP data path is established between caller and callee to exchange user data packets. Due to network conditions such as poor RF conditions, user data packets may get dropped, creating media gaps.

Using principles described herein, loosely characterized KPIs such as successful calls, failed calls, dropped calls, mute calls are characterized based on a plurality of protocol and data exchanges associated with such calls. Some of these KPIs are derived based on SIP alone, and other are based on RTP, S11, or other protocols in addition to SIP. According to principles described herein, information from multiple protocols such as SIP and RTP transactional procedural steps are used along with several other pieces of information such as underlying transport layer tunnel changes due to mobility for a call based on SIP call-ID, transport tunnel IDs on which the SIP traffic is carried, User IP Address & Port Numbers, and S11 etc.

The collection module 120 may also be able to identify VoLTE-To-VoLTE calls. This may be done by analyzing the SIP protocol packets in both directions (uplink and downlink directions on the S1U interface). Specifically, if both the originating and terminating user devices are in the VoLTE RAN, it may be determined that both are VoLTE. This may be achieved using the following steps: Convert From, To Field to a common format. The treatment is different for From & To; (a) Convert all character to same case; (b) Extract string after SIP: or SIP:+, TEL:, TEL:+ and before @ as "Address (Addr)". The string @xxx may or may not appear after Addr; (c) If Addr starts with a digit (0-9) and it's length=10 digits, and the 1st digit is not a zero, prepend with country code 91; With this all digit fields of addr become 12 digits. In the "TO" field any address such as "*41" etc., remain unchanged; (d) Any non-digit strings in the From/To fields will remain same along with "@xx" string. Only 10 digit fields that do not have '0' as the 1st digit will be prepended with 91; (e) If the "dir="Down", swap "From and To" field. The new fields are names as fr2 and to2; (f) FR2TO2=CONCAT(FR2, T02) Fpr each FR2TO2 count UP & Down. For each FR2TO2, the minimum count gives the number of Volte to VOLTE Calls for that From/TO Pair.

This method gives only counts but does not identify which call is V-V or not. To identify each call as V-V or not: repeat steps (a)-(f); Sort in FR2TO2, Record Start Timestamp (tr_starts_ts); For each FR2TO2 compute Delta Time from Previous record (same Fr2TO2). If "dir" of previous & current records differ and the delta-time <300 Seconds, then the call is V-V.

The collection module 120 may also mark certain calls as conference calls, multi-party calls, or calls on hold. This may be done by correlating the plurality of control and user planes (QCI 5 and QCI1), SIP & RTP, S11 & S1-MME and further correlating the time boundaries of SIP & RTP sessions of a user. In VOLTE, the SIP and RTP sessions of a user may traverse on the same GTP-U Tunnels (Overt the TOP VOIP), or unique dedicated bearers for improved QOS. For example, SIP uses QCI5 bearer and RTP uses QCI1 bearers. Multi-party calls are identified, by determining additional INVITEs while one call is active, and multiple sources are present in the RTP packets. In multi-party calls where there are more than two participants, data sources in RTP indicate multiple sources in overlapped time intervals. Multi-party calls are differentiated from hold calls by differentiating time overlapped calls with data from one source only in an interval, and SIP cause codes.

The analytics module 122 takes the event objects from the collection module 120 and classifies them based on the information contained within the event objects. This may be done, for example, through use of a rules table (e.g., 300, FIG. 3). More detail on the rules table 300 will be discussed in the text accompanying FIG. 3. In short, the rules table may include several entries, each entry having a combination of parameters corresponding to data points in the event objects. Each entry may also be associated with one or more KPIs. For example, various combinations of data points from an event object may be associated with a dropped call KPI or a failed registration KPI. Classification mechanisms other than the rules table may be used as well. Additionally, there may be more specific versions of a KPI. For example, for the failed registration KPI, there may be a number of sub-KPIs such as a failed registration paired with a specific cause code and/or reason code The analytics module 122 takes the classified event objects and performs various functions to infer relationships from those event objects. For example, in addition to the data points used to classify the event objects, the event objects include several other data points such as type of devices used in the call, geographic location, information from user device, information from other network elements (e.g. OSS/NMS), external information outside of the network and other data points that may be associated with the call and used as inputs. The inference module 124 may infer relationships between those inputs and the KPIs associated with those event objects. This may be done, for example, using a machine-learning function.

The inference module 124 produces many models depending on the input data and each specified output. Machine-learning techniques generally involve comparing input data (e.g., device type, geographic location, network route) with a specified output (e.g., KPI) in order to derive a model that describes the relationship between the input and the output data. As additional data is collected regarding the input and the actual output, the model is updated.

The inference module 124 may selectively choose a mix of event objects that correspond to a desired ratio of "negative" events with corresponding "positive" events. For example, for every event object classified as a failed registration, the inference module may include ten event objects classified as a successful registration. This ratio may be selected by an administrator to achieve desired results.

In some examples, the inference module 124 may have the ability to iteratively add data to the event objects from varying sources (user devices, external sources, other network elements), without worry of having to perform all of the necessary steps of machine learning function fitting. In other words, the inference functions within a product embodying principles described herein may be configured to add various pieces of input and look for confidence scores of most probable cause. If a threshold level of confidence is not achieved, the inference functions may automatically add more pieces of information and see if the confidence scores for a particular KPI have increased. This may be done while the user is using the product embodying principles described herein without relying on traditional approach of introducing data scientists to retrain the model.

In some examples, information from the inference module may be used to update and enhance the rules table used by the analytics module 122. For example, a rules table may start out generically with broad KPI definitions. For example, the rules table may start out by classifying all cause codes in the 500-599 range as being a registration failure. Using the inference functions, the inference module may determine probable causes for the failed registration and this information may be worked into the sub-category and next best action fields of the rules table (as will be described below) in an automated way.

By using the classification techniques described herein, the data may be better formatted for efficiently inferring relationships between input parameters and KPIs in order to determine probable causes of issues.

Figure 2:
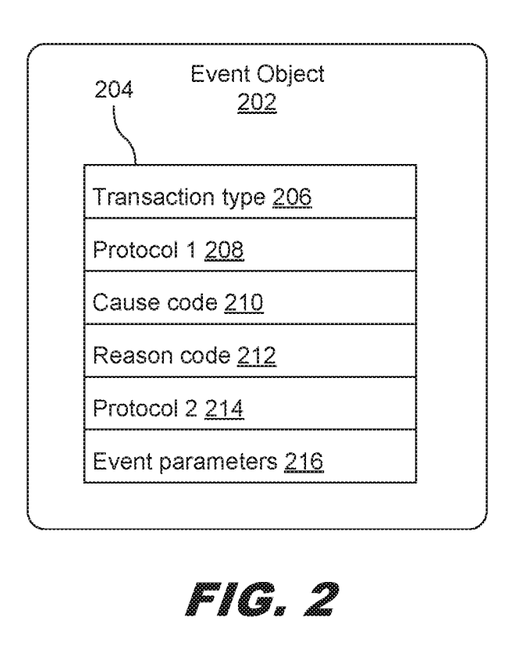
FIG. 2 is a diagram showing an illustrative event object that may be classified, according to principles described herein.

FIG. 2 is a diagram showing an illustrative event object 202 that may be classified into a particular KPI based on information 204 from at least two different protocols contained therein. In the present example, the event object 202 includes a transaction type field 206, a first protocol field 208, a cause code field 210, a reason code field 212, a second protocol field 214, and an event parameters field 216.

The transaction type field 206 indicates the type of transaction associated with the event. For example, the transaction type may be a register transaction. This may be, for example, a SIP register request. A register request is used by a device to let a server know where it is (i.e., it's destination address). The transaction type may also be a deregister transaction. The transaction type may also be an invite request. An invite request sends a message to a server requesting to set up a communication session. The transaction type may be a bye request, which is used to end a communication session. Other transaction types may include reinvite, an Sv_REQ_RESP transaction, an Sv_COMP_NTFY transaction, and an Sv_CNCL_NTFY transaction. A given call is typically expected to include multiple transactions from the beginning of the call, through the data transfer, and to the end of the call. Thus, an event object associated with a particular call may include multiple transactions.

The first protocol 208 field indicates the type of communication protocol associated with a transaction of the event object 202. Various protocols may include, SIP, RTP, Q.850 and others. Such protocols include various operations to establish calls or transmit data between endpoints. Such protocols also use cause codes and reason codes to indicate the success or failure of certain actions. In fact, many protocols have their own sets of cause codes.

The cause code field 210 lists a cause code associated with the event object 202. For example, the cause code may be 200, indicating success; a cause code may be 400, indicating a failure; a cause code may include 486, indicating that the callee is busy (all three examples being SIP cause codes). There are a variety of other cause codes to indicate various outcomes. The reason code field 212 may include more specific information about the reason why a particular cause code was provided. For example, there may be several reasons why a cause code 486 is provided. The reason code may give more specific information as to why the callee is busy. Many protocols have their own sets of reason codes.

The second protocol field 214 may include information from another protocol. For example, the second protocol field 214 may include information from a lower layer such as a physical layer protocol that is associated with the transaction. In other words, while the transaction type for protocol 1 may be a SIP INVITE transaction, the information within the second protocol field 214 may indicate a radio failure. Thus, while the cause and reason codes for the first protocol transaction (e.g., SIP INVITE) provide some information, the additional information from another protocol may provide more specific information to classify an event as a dropped call and identify the underlying reason for the dropped call.

The event parameters field 216 may indicate a variety of information associated with the event. For example, the event parameters field 216 may indicate the types of device or devices indicated in the event. For example, if the event relates to a call between two mobile devices, then the event parameters field may include information identifying both caller and callee devices. In some cases, only the callee device may be provided. The event parameters may include other types of information such as geographical location, specific eNodeb's involved in the event, specific routers, specific servers, etc.

Figure 3:
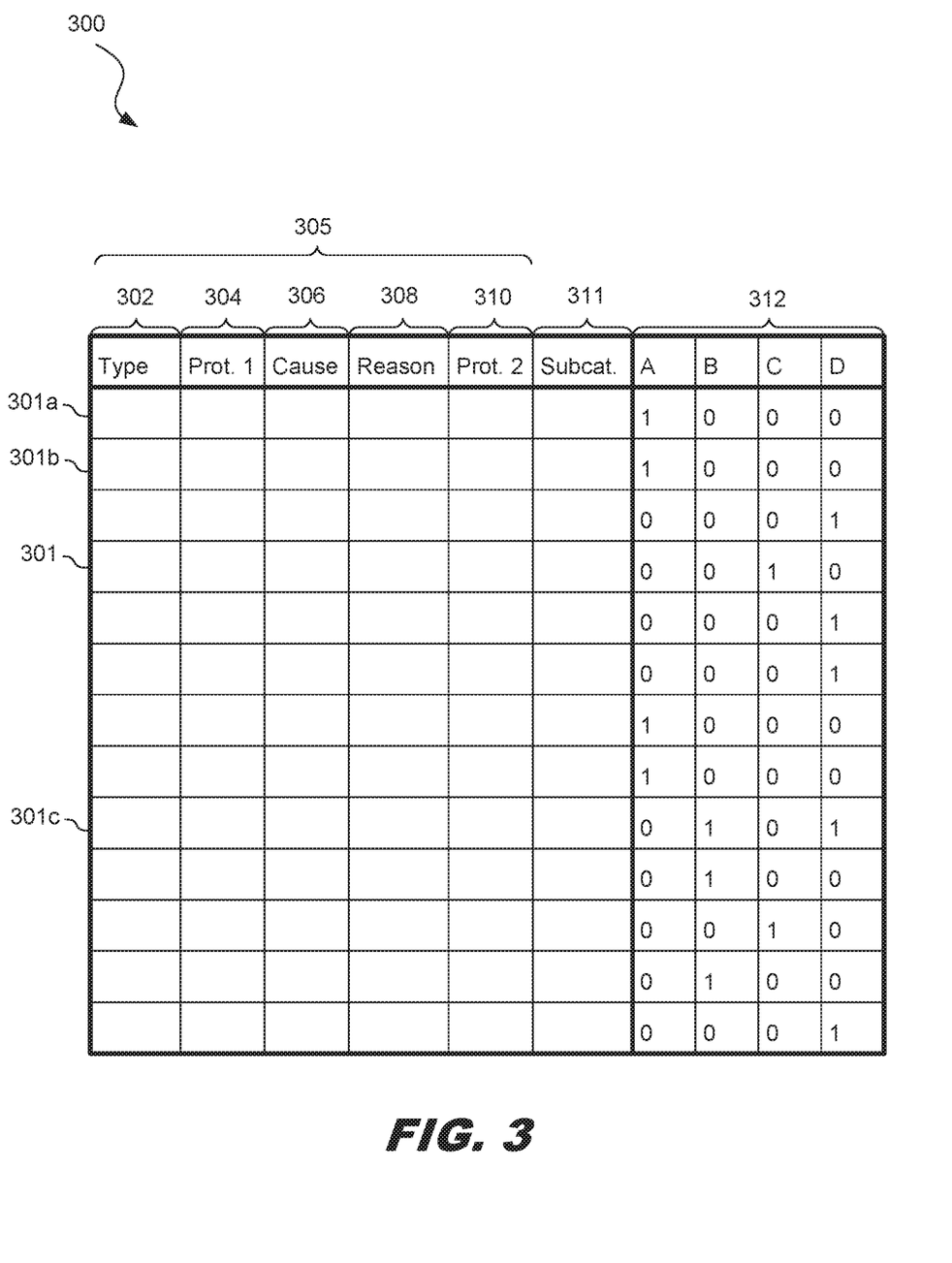
FIG. 3 is a diagram showing an illustrative rules table that may be used to classify event objects, according to one example of principles described herein.

FIG. 3 is a diagram showing an illustrative rules table 300 that may be used to classify event objects (e.g., 202, FIG. 2). According to the present example, the rules table 300 includes a number of columns. Specifically, the rules table includes a set of event columns 305, a subcategory column 311, and a set of KPI columns 312. The event columns 305 include a transaction type column 302, a first protocol column 304, cause code column 306, a reason code column 308, and a second protocol column 310.

The rules table 300 also includes several entries 301. Each entry 301, includes various combinations of information from the event columns. For example, there may be several entries that list an "invite" in the transaction field. For each of the entries that have an "invite" in the transaction field, there may be several entries with a particular cause code. For each entry with a particular transaction and cause code, there may be entries with various protocol types and reason codes.

For each entry, there are a number of KPI columns. Each KPI column 312 (e.g., A, B, C, or D) may correspond to a different KPI. As mentioned above, KPIs may include successful call attempt, failed call attempt, dropped call, media failure, successful registration, failed registration, inter-working success, and inter-working failure. In some examples, for each entry 301, there may be a "1" in one of the KPI columns indicating that the combination of information from the event columns 305 of that entry correspond to that particular one of the KPI columns. The rest of the columns in that entry 301 may include the value "0." In some examples, a particular entry may identify with more than one KPI and thus there may be multiple '1's in the KPI columns for a given entry. In some examples, instead of having a number of KPI columns with ones and zeros, there may be a single KPI column in which a particular KPI is listed. A more detailed example of a rules table may be found in the provisional application to which this application claims priority, such provisional application being incorporated herein by reference.

As a more specific example, both entries 301a and 301b include a "1" in column A. Thus, in the example, where A represents a failed registration, the rules table provides two different situations in which the KPI is a failed registration. Additionally, entry 301c includes a 1 in both the B column and the D column. Thus, some entries may be associated with more than one KPI.

Using the rules table 300, the analytics module (e.g., 122, FIG. 1) may classify event objects received from the collection module (e.g., 120, FIG. 1). For example, a received event object may indicate a register transaction using SIP with a particular cause code and reason code. The analytics module may find an entry 301 with those parameters and classify the event object based on the KPIs corresponding to that entry. For example, the analytics module may determine which columns of the matching entry have a "1" in the KPI columns 312. The classified event object may then be passed to the inference module (e.g., 124, FIG. 1).

In some examples, classifying an event object to a particular KPI may involve a subset of the protocol attributes. In other words, classification may rely on some, but not all of the protocol attributes. For example, failed call attempts and successful call attempts involve SIP protocol transaction information, but do not rely on RTP protocol information. The event table that stores records for multiple protocols may be first filtered by removing "unused" protocols, thus reducing the data volume to be processed by machine-learning functions or rules table processing. For some KPIs such as established calls, unique calls may be determined first based on concatenation of CallID with IMSI information, and then UniqueCallIds may be used to filter the event data for other KPIs such as one-way calls, media gaps etc. This information may be used to form a deep learning chain for classification.

Each transaction may include a request and one or more response events. For example, a user CALL attempt using an INVITE Transaction, may be completed with 2OOOK response or provisional response indicating progress, as well as a 2OOOK Response. Each response has one or more cause attributes, for example status codes per SIP Protocol (RFC 3261) and reason header from ISUP (Q.850). The status and reason fields broadly differentiate success codes (1XX), client failures (4XX), server failures (5XX) etc., at the SIP transaction level. These SIP codes do not classify underlying subsystems, and also do not classify behavior of user data (RTP) such as one-way data, media gaps etc. The rules table of FIG. 3 associates a plurality of protocol flows with a VOLTE/VILTE call, characterizes the failure or quality of the call, and identifies the possible subsystems for next level of trouble-shooting for root cause.

Summarized information from RTP data records that include, downlink bytes, uplink bytes, interpacket gaps, jitter, delay, UP Link timeouts, Downlink Timeouts etc., are combined with SIP call records "DATA" events by correlation using IMSI, User IP Addresses, SGW, ENB IP Addresses, TCP/UDP Port Numbers, event Timestamps etc. Similarly, event data from other protocol events, such as S11 tunnel creation/deletion events, Sv (SRVCC) VOLTE to CS Handover are correlated using common attributes such as IMSI, MSISDN, From/To Identifiers, event time stamp etc. The cause code for the event, and its effect on the VOLTE call (SIP or RTP) flows of user calls is identified. For example, a tunnel deletion event due to "Inactivity" or "Radio Connection with UE Lost," could cause a timeout in an RTP or SIP transaction. Based on event timestamps of SIP and RTP, the call duration may be computed. For example, the difference between timestamps of BYE and INVITE with the same callID, or the difference between the 1st and last time stamp with the same IMSI.CallID may indicate the total duration of that call.

Uplink/downlink data volume for the same user (IMSI) by other applications (other Radio Access Bearers) may also be captured. This helps in identifying Multi-Application (e.g., VOLTE and NON-VOLTE applications in an overlapped time) calls and increases the confidence level for "failure category". For example, when a mobile user is in a bad coverage area, uplink/downlink volumes in the UL tunnels for both VOLTE and NON-VOLTE may be low and helps identify the failure category as "RADIO Reason."

Priorities are assigned considering the protocol, protocol status code and the reason protocol along with the reason code. The failure cases are assigned with sub categories based on the underlying status/reason codes and possible subsystems that the status or reason codes correspond to. Based on correlation IDs within event data, and event time stamps, all the protocol events corresponding to a user and call are grouped to determine the "subcategory" column 310 in the rules table 300.

The subcategory column 310 may further categorize events by more than just a generic KPI. For example, the subcategory column 310 may include labels such as Device issue, IMS core issue, server busy/packet loss, IMS core provisioning, IMS core routing, breakout call failure. If, for a particular entry, a particular combination of information from the event columns 305 does not correspond to a particular subcategory label, then the field in the subcategory for that entry may be denoted as "other."

In some examples, a rules table 300 may include a next best action column (not shown). The next best action field for each entry may include an indication of an ideal solution for further investigation. If no ideal solution specific to the problem exists for a particular entry, the next best action column of that entry may be denoted as "other."

Figure 4:
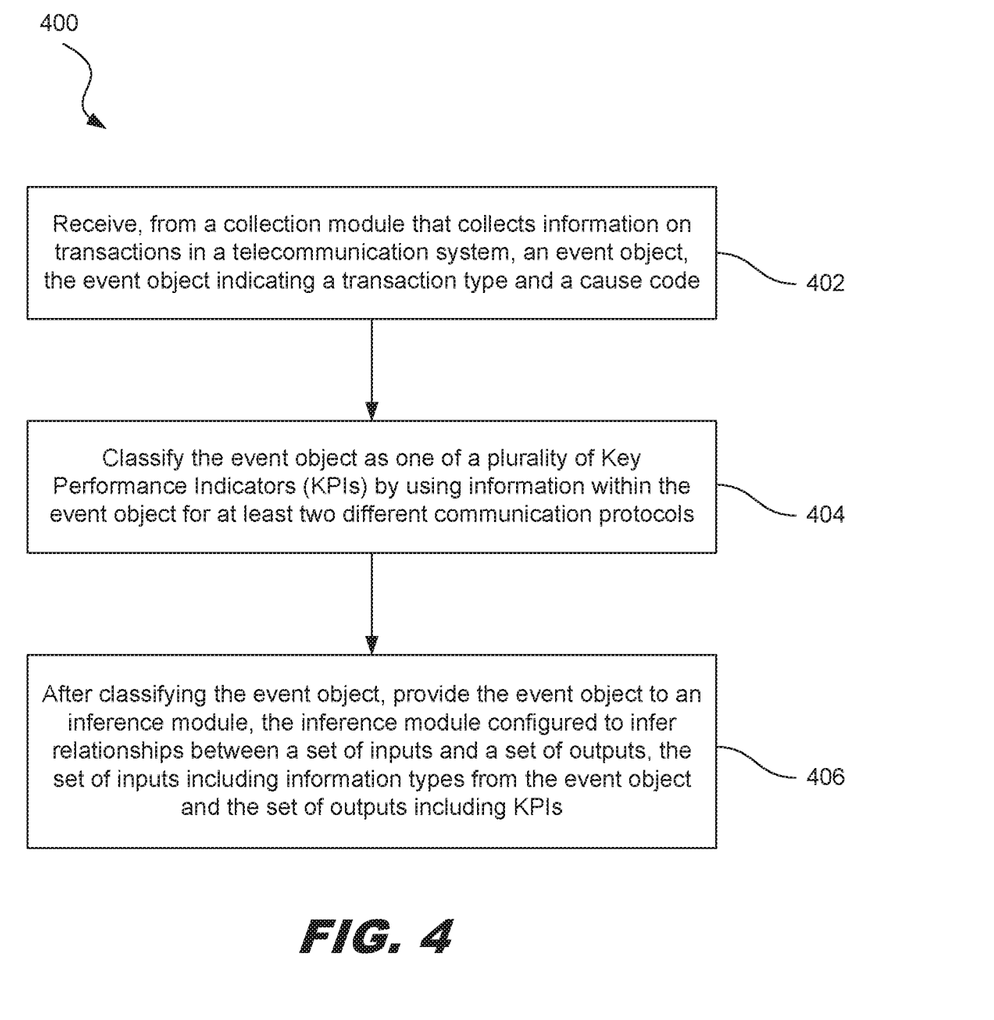
FIG. 4 is a flowchart showing an illustrative method for classifying event objects based on information from multiple protocols, according to one example of principles described herein.

FIG. 4 is a flowchart showing an illustrative method 400 for classifying event objects based on information from multiple protocols. According to the present example, the method 400 includes a process 402 for, receiving, from a collection module that collects information on transactions in a telecommunication system, an event object, the event object including parameters associated with a telecommunication event (e.g., a VoLTE call, a 5G call, or the like). The collection module may obtain such parameters by receiving information for capture devices that are used to capture information being transmitted within a telecommunication network such as an LTE or 5G network.

The method 400 further includes a process 404, for, with a classification mechanism, classifying the event object as one of a plurality of Key Performance Indicators (KPIs) by using the parameters, the classification mechanism configured to consider information from multiple protocols for classifying event objects. The classification mechanism may be, for example, a rules table (e.g., 300).

The method 400 further includes a process 406 for, after classifying the event object, providing the event object to an inference module, the inference module configured to infer relationships between a set of inputs and a set of outputs, the set of inputs including information types from the event object and the set of outputs including KPIs. The inference module may utilize, for example, a machine learning function that determines relationships between a set of input parameters and a set of output parameters. In some examples, the set of input parameters to the machine learning function may be the event parameters (e.g., 214, FIG. 2) that include the device type, route, packet jitter or delay, etc. This may be done, for example, through use of a root cause analysis inference engine. More detail on the inference engine are discussed in U.S. application Ser. No. 16/962,814, titled "Most Probable Cause Determination For Telecommunication events," filed on Jul. 16, 2020.

Figure 5:
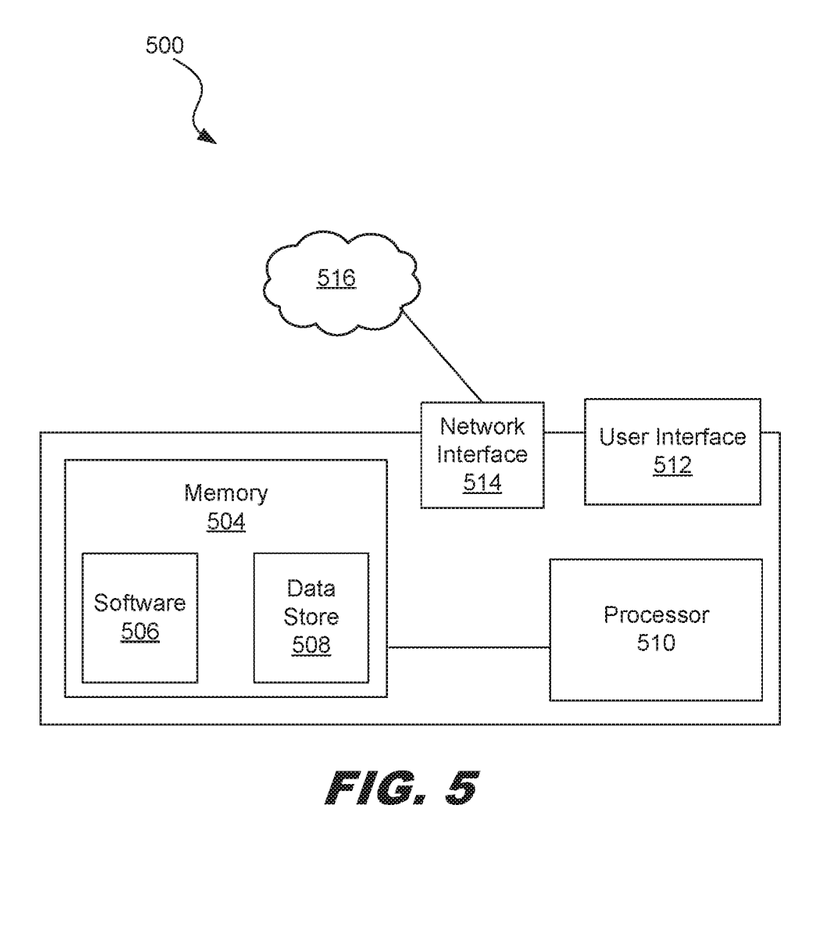
FIG. 5 is a diagram showing an illustrative computing system that may be used to perform the functions related to event object classification described herein.

FIG. 5 is a diagram showing an illustrative computing system that may be used to perform the functions related to event object classification described herein, such as the functions described above in the text accompanying FIG. 4. In other words, the computing system 500 may be used to perform the functions associated with the analytics platform 101. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. The software 506 may be, for example, software designed to provide a web communication feature creation service. In such case, the computing system 500 may be associated with the web communication service. In some examples, the computing system 500 may be associated with a user. In such case, the software 506 may be an application to render web content, such as a browser. The software 506 may include machine readable instructions of a computer program product that when executed, perform the functions described above in accordance with the text accompanying FIG. 4.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a computing system that collects information on transactions in a telecommunication system, the method comprising:
    receiving an event object, the event object including parameters associated with a telecommunication event;
    classifying the event object, using a classification mechanism, as one of a plurality of Key Performance Indicators (KPIs) by using the parameters, including considering events from multiple protocols for classifying event objects; and
    after classifying the event object, inferring relationships between a set of inputs and a set of outputs, the set of inputs including information types from the event object and the set of outputs including KPIs.

2. The method of claim 1, wherein the classification mechanism comprises a rules table, the rules table having entries that correspond to at least two different communication protocols.

3. The method of claim 2, wherein entries in the rules table include a subcategory field.

4. The method of claim 1, wherein the KPIs include an item selected from the list consisting of: successful call attempt, failed call attempt, dropped call, media failure, successful registration, failed registration, inter-working success, and inter-working failure.

5. The method of claim 1, wherein the at least two protocols include an item selected from the list consisting of: Session Initiation Protocol (SIP), Real-time Transfer Protocol (RTP), S11, S1AP, and Q.850.

6. The method of claim 1, wherein the transaction type includes an item selected from the list consisting of: a register transaction, a deregister transaction, an invite transaction, a reinvite transaction, a bye transaction, an Sv_REQ_RESP transaction, an Sv_COMP_NTFY transaction, and an Sv_CNCL_NTFY transaction.

7. The method of claim 1, wherein the collection module collects data being transmitted between a Radio Access Network (RAN) and a Mobility Management Element (MME).

8. The method of claim 1, wherein the collection module collects data being transmitted between a Radio Access Network (RAN) and a Serving Gateway (SGW).

9. The method of claim 1, wherein the parameters include an item selected from the list consisting of: a transaction type, a cause code, a reason code, and locally inferred attributes including at least one of timeouts, packet drops, jitter, or delay.

10. The method of claim 1, wherein the inference module includes a machine learning function to infer the relationships.

11. The method of claim 1, further comprising updating the classification mechanism based on information from the inference module.

12. The method of claim 1, wherein the classification mechanism assigns a color code to the KPIs to indicate severity.

13. A system comprising:
    a processor; and
    a memory having machine readable instructions that when executed by the processor, cause the system to:
        receive, a plurality of event objects, each event object including a set of parameters for an associated event;
        with a classification mechanism, classify the event objects as one of a plurality of Key Performance Indicators (KPIs) by using the parameters, the classification mechanism configured to consider events from multiple protocols for classifying event objects; and
        after classifying the event objects, inferring relationships between a set of inputs and a set of outputs, the set of inputs including information types from the event object and the set of outputs including KPIs.

14. The system of claim 13, wherein to classify the event objects, the system is further to utilize a rules table, the rules table having a set of entries, at least one of the set of entries having information corresponding to at least two different communication protocols.

15. The system of claim 14, wherein entries in the rules table include a subcategory field.

16. The system of claim 13, wherein the KPIs include an item selected from the list consisting of: successful call attempt, failed call attempt, dropped call, media failure, successful registration, failed registration, inter-working success, and inter-working failure.

17. The system of claim 13, further comprising a collection module that collects data between a Radio Access Network (RAN) and a core network.

18. A computer readable program product comprising machine readable code on a non-transitory computer readable medium, the computer readable program product comprising:
    code for receiving, from a collection module that collects information on transactions in a telecommunication system, an event object, the event object indicating parameters for an event associated with the event object;
    code for classifying the event object as one of a plurality of Key Performance Indicators (KPIs) by applying the parameters to a rules table, the rules table including entries for at least two different communication protocols; and
    code for, after classifying the event object, providing the event object to an inference module, the inference module configured to infer relationships between a set of inputs and a set of outputs, the set of inputs including information types from the event object and the set of outputs including KPIs.

19. The computer program product of claim 17, wherein the parameters include a transaction type, a cause code, a reason code, and locally inferred attributes.

20. The computer program product of claim 17, wherein the KPIs include an item selected from the list consisting of: successful call attempt, failed call attempt, dropped call, media failure, successful registration, failed registration, inter-working success, and inter-working failure.

* * * * *